United States Patent [19]

Negishi

[11] Patent Number: 4,670,095

[45] Date of Patent: Jun. 2, 1987

[54] METHOD FOR FORMING PARTIAL FILMS ON UNEVEN SURFACES OF OBJECTS

[76] Inventor: Masataka Negishi, 29-19, Daito 2-chome, Urawa-shi, Saitama-Ken, Japan

[21] Appl. No.: 821,679

[22] PCT Filed: May 1, 1985

[86] PCT No.: PCT/JP85/00249

§ 371 Date: Mar. 3, 1986

§ 102(e) Date: Mar. 3, 1986

[87] PCT Pub. No.: WO85/05191

PCT Pub. Date: Nov. 21, 1985

[30] Foreign Application Priority Data

May 1, 1984 [JP] Japan .................................. 59-88030

[51] Int. Cl.$^4$ ........................ B44C 1/22; C03C 15/00; C03C 25/06
[52] U.S. Cl. .................... 156/655; 156/659.1; 156/668; 156/904; 350/162.16; 350/162.21; 350/167; 350/409; 427/165; 427/271; 427/287; 430/5; 430/321
[58] Field of Search ................... 430/5, 321, 323, 326; 156/655, 659.1, 661.1, 668, 904; 427/43.1, 54.1, 162, 163, 164, 165, 271, 272, 287; 350/162.16, 162.17, 162.18, 162.2, 162.21, 162.22, 167, 409, 412, 417, 424

[56] References Cited

U.S. PATENT DOCUMENTS 3,542,453 11/1970 Kantor .................. 350/162
3,658,528 4/1972 Berman et al. .................. 430/321
3,669,673 6/1972 Ih et al. .................. 430/321 X
4,405,405 9/1983 Fujii et al. .................. 156/647 X

FOREIGN PATENT DOCUMENTS 0157705 12/1980 Japan .
0111803 9/1981 Japan .
0111804 9/1981 Japan .

Primary Examiner—William A. Powell
Attorney, Agent, or Firm—Wenderoth, Lind & Ponack

[57] ABSTRACT

In order to form a minute light shielding film at a specific portion of an uneven surface of an object such as a Fresnel lens, a Fresnel plate, or a compound lens and more particularly of an optical-path-varying element, a photosensitive film (10) is previously applied onto the uneven surface and is irradiated with the light rays (11) emitted from an obliquely disposed light source. As a result, the surface of the ridge portion of the uneven surface which faces the light source is exposed to the light rays, while the remaining surface which does not face the light source is left unexposed to the light rays, whereby the portion (10a) of the light sensitive film exposed to light rays or that (10b) unexposed to light rays changes its properties. Thereafter the photosensitive film is subjected to etching and washing so that part of the photosensitive film is removed while the remaining light sensitive film remains as a light shielding film because of the difference in properties between the exposed and unexposed light sensitive film portions (10a, 10b).

15 Claims, 21 Drawing Figures

METHOD FOR FORMING PARTIAL FILMS ON UNEVEN SURFACES OF OBJECTS

TECHNICAL FIELD

The present invention relates to a method for forming partial films at specified portions of surface having concavities and convexities or an uneven surface of an object or an optical-path-varying element such as a lens, a prism, a Fresnel plate or the like.

BACKGROUND ART

Various methods have been devised and demonstrated for forming partial films on a transparent sheet or plate made of glass or plastic, thereby defining portions through which light rays are transmitted and the other portions which inhibit the transmission of the light rays. In order to define the light-transmission portions and the non-light-transmission portions which are spaced apart from each other by a very small distance, it is useful to employ a photoetching process which is used to fabricate integrated circuits and so on.

According to the photoetching process, a plurality of precision photomasks must be used and registered with each other with an extremely high degree of accuracy.

However, it is very troublesome to define lighttransmission portions and non-light-transmission portions which are spaced apart from each other by a very small distance on glass or plastic three-dimensional bodies with uneven surfaces such as compound lenses, compound prisms, Fresnel lenses or lenticular plates (corrugated lenses) for forming three-dimensional photos, and glass or plastic Fresnel sheets or plates by such photoetching process. Furthermore, their considerably high coefficients of thermal expansion must be taken into consideration, so that the film coating process including the temperature control system becomes very complicated. As a result, they are not suited to be mass produced, whereby their costs become very high.

The present invention was made to overcome the above and other problems encountered when specified portions of an uneven surface of an object are coated with films and the object of the invention is to provide a method for forming partial films over an uneven surface of an object in which the uneven surface of the object, especially an optical-path-varying object such as a lens, prism, Fresnel plate or the like is irradiated with parallel, converged or diffused light rays coming from a specific direction and thereafter the uneven surface thus exposed to the light rays is subjected to etching and washing steps so that colored films (for instance, black films) are formed at specified portions of the uneven surface of the object which are spaced apart from each other by an extremely small distance, in a positive manner and at less cost without the use of photomasks, temperature controls, and precision steps which are required in the conventional methods.

DISCLOSURE OF THE INVENTION

According to the method for forming a partial film layer over an uneven surface of an object in accordance with the present invention, first, a photosensitive agent is applied to the entire uneven surface, thereby forming a photosensitive film; the uneven surface thus coated with the photosensitive agent is irradiated with the light rays emitted from an obliquely disposed light source in such a way that only the surface portions of the ridge portions which face the light source are exposed to the light rays while the remaining surface portions which do not face the light source are left unexposed to the light rays; and the photosensitive film thus treated is subjected to etching and washing steps so that the photosensitive film is left only at either the exposed or the unexposed portions.

BEST MODE FOR CARRYING OUT THE INVENTION

In general, there are cases wherein it is desired to carry out a treatment for adherence of a colored layer such as black by delustering, with the object of shielding off light and preventing glare, on portions of three-dimensional articles such as compound lenses, compound prisms, Fresnel lenses, and lenticular plates and Fresnel sheets or Fresnel plates (referred to hereinafter collectively as optical-path-varying elements) such as, for example, optical-path-varying elements 1a through 1f shown in FIGS. 1 through 6. The reason for delustering is that irregular (diffused) reflection, not regular (mirror) reflection, of light by the surface of the colored layer is desired. In practice, the rear surface of the colored layer, that is, the surface of contact of the colored layer with the surface of an optical-path-varying element must be a matted or aventurine surface.

Figure 1:
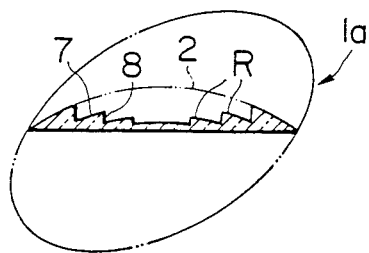
FIGS. 1 through 6 are views respectively showing examples of different optical-path-varying elements which are objects to which the method of the present invention can be applied.

Next the optical-path-varying elements shown in FIGS. 1 through 6 will be described. The optical-pathvarying element shown in FIG. 1 is a Fresnel lens 1a and is in the form of a disk having the same optical properties as a convex lens 2. One major surface of the Fresnel lens 1a has a stepped surface. The annular steps are concentric and each annular step R has a sawtooth cross sectional configuration. The Fresnel lens 1a has inclined surfaces 7 through which transmission of light rays is desired and other surplus vertical surfaces 8.

Figure 2:
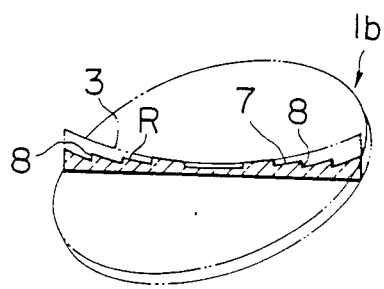

The Fresnel lens 1b shown in FIG. 2 is in the form of a disk having the same optical properties as a concave lens 3. The annular steps are concentrical and have a sawtooth cross sectional configuration. As in the case of the Fresnel lens 1a shown in FIG. 1, each annular step R has an inclined surface 7 and a vertical surface 8.

Figure 3:
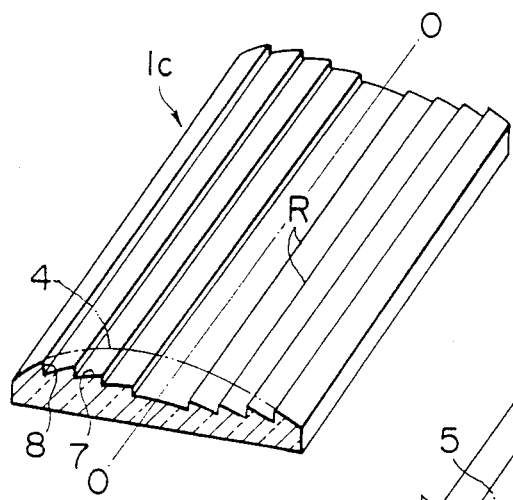

The Fresnel plate 1c shown in FIG. 3 has the same optical properties as a convex plano-cylindrical lens 4 of a segmental cross section and has parallel and straight steps R which have a sawtooth cross sectional configuration. Each step R has an inclined surface 7 and a vertical surface 8. All of the steps R are symmetrical with respect to the center line 0—0 of the Fresnel plate 1c.

Figure 4:
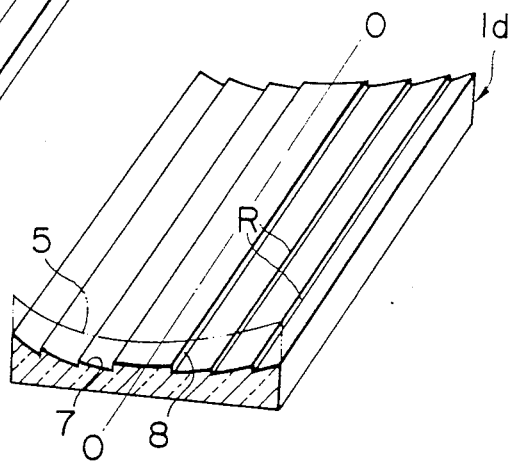

The Fresnel plate 1d shown in FIG. 4 is substantially similar in construction to the Fresnel plate 1c as shown in FIG. 3 except that the Fresnel plate 14 has the same optical properties as a concave planocylindrical lens 5.

Figure 5:
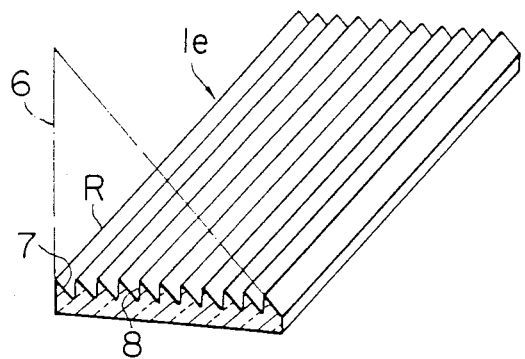

The Fresnel plate 1e shown in FIG. 5 has a plurality of straight steps which are parallel to each other and has the same optical properties as a triangular prism 6. The inclined surfaces 7 are inclined in the same direction.

Figure 6:
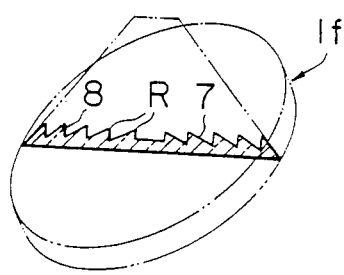

The Fresnel lens 1f shown in FIG. 6 has a plurality of concentric annular steps R having a sawtooth cross sectional configuration, and the steps R have the same height. The Fresnel lens 1f exhibits the same optical properties as a trapezoidal lens indicated by the two-dot chain lines.

These optical-path-varying elements 1a through 1f are easily produced by a compression method, an injection method, a casting method, etc. so as to have fine surface unevenness. It is preferable to use plastics as materials which are less expensive than glass. As described above, these optical-path-varying elements 1a through 1f have portions 7 (inclined surfaces) through which light rays are to pass and portions (vertical surfaces) 8 through which no light rays are to pass. These vertical surfaces 8 cause various problems such as degradation of contrast by glare, double images, diffusion effects and so on and sensation of lack of clearness because these vertical surfaces 8 look white. Accordingly, for the reason that it is desirable that the vertical surfaces 8 have no luster, there is an example in the prior art wherein only the vertical surfaces 8 are aventurine treated by a special process. This aventurine process can prevent glare to a considerable extent, but in the present state of the art there is no process for such treatment, and a thorough solution has not been attained.

The present invention was made on the basis of the above described technical background and will now be described in more detail hereinbelow.

Figure 7:
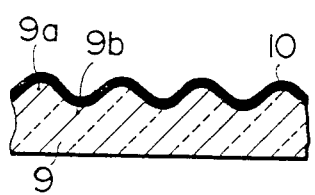
FIG. 7 is a fragmentary sectional view showing one example of an optical-path-varying element coated with a photosensitive agent.
Figure 8:
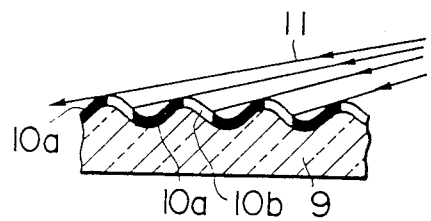
FIG. 8 is a fragmentary sectional view showing a state of projection of light onto the optical-path-varying element shown in FIG. 7.

FIGS. 7 and 8 show the fundamental principle of the light exposure process in the method of the present invention. FIG. 7 shows an optical-path-varying element 9 as an example of a body having an uneven surface. This element 9 is made of, for instance, a transparent material and has one major surface which is corrugated. The uneven surface comprises convex or ridge portions 9a and concave or valley portions 9b, and a conventional photosensitive agent is applied to the whole surface (or to a portion or portions where colored layers such as black layers are to be formed), thereby forming a photosensitive film 10. As is well known in the art, photosensitive agents are divided into a positive type and a negative type. When a positive type photosensitive agent is used, the portions exposed to light rays (for instance, ultraviolet rays) are removed after the washing step after the exposed portions have been treated with a chemical agent such as a developing agent. As a result, those portions which are not exposed to light rays remain. On the other hand, when a negative type photosensitive agent is used, the portions which have been exposed to light rays are hardened and remain while the portions which are not exposed to the light rays are washed away. In the present invention, either of a positive or a negative type photosensitive agent may be used. In this example, it will be assumed that a positive type photosensitive agent is used.

After the photosensitive film 10 has been formed in this manner, light rays (for instance, ultraviolet rays) 11 whose parallelism, constringence or diffusiveness is designed according to geometrical optics, is so projected onto the photosensitive film 10, as shown in FIG. 8, from a light source in directions oblique to the ridge and valley portions 9a and 9b of the optical-path-varying element 9 that the portions 10a which are not to be coated with a colored film (referred to as "a black film" hereinafter) are not exposed to the light rays 11, while the portions 10b which are to be coated with a black film are exposed to the light rays 11. In FIG. 8, the black portions 10a are not exposed to the light rays while the white portions 10b are exposed to the light rays 11. As show in FIG. 8, the portions 10a at which the photosensitive film 10 is to remain are not exposed to the light rays 11 while the portions 10b at which no photosensitive film is to remain are exposed to the light rays 11. Thereafter the photosensitive film 10 is etched with a suitable chemical agent and washed so that the photosensitive film 10 at the exposed portions 10b is removed, whereby the black film can be readily formed on the unexposed portions 10a.

Figure 9:
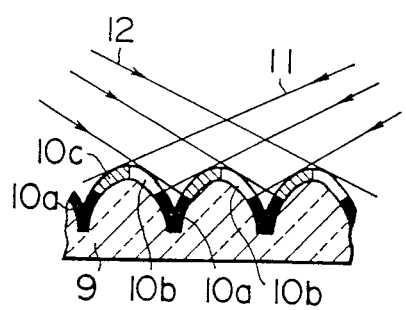
FIG. 9 is a fragmentary sectional view showing another mode of light irradiation.

In this case, the area of a portion to be exposed is limited by the direction of the light rays 11. For instance, as indicated in FIG. 9, sometimes it is desired to remove, in addition to the white portions, the photosensitive film 10 at the hatched portions 10c also. In this case, another light source is suitably disposed so that the oblique light rays 12 strike the hatched portions 10c also from the opposite side. Thereafter the photosensitive film 10 is subjected to etching so that the photosensitive film 10 on the hatched portions 10c can be washed away.

Figure 10:
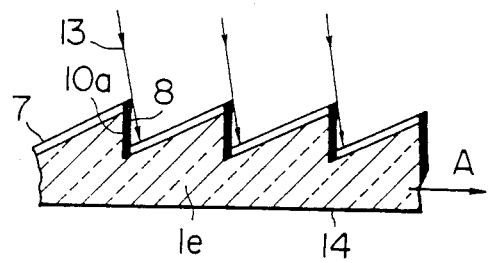
FIG. 10 is a fragmentary sectional view showing a further light irradiation mode.

In the above described example, the parallel light rays 11 and 12 have been described as being projected onto the whole surface of a Fresnel body 9 so as to leave the black light shielding film 10 at desired portions, but in the case of the Fresnel plate 1e as shown in FIG. 5, the parallel light rays 13 are made to obliquely irradiate the whole or part of the surface of the uneven surface of the Fresnel plate 1e while the Fresnel plate 1e is shifted in the direction indicated by the arrow A in FIG. 10 relative to the light source, whereby the black light shielding film 10a is formed over the vertical surfaces 8 of the Fresnel plate 1e which are perpendicular to the flat surface 14.

As described above, there are various methods of exposing to light various bodies as will be described below with respect to examples thereof.

Figure 11:
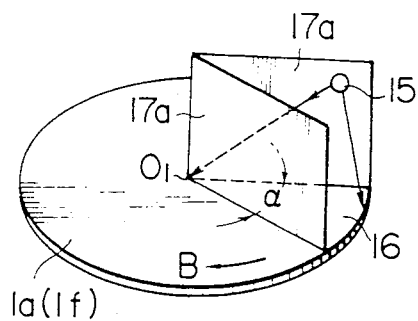
FIG. 11 is a perspective view showing a mode of light projection onto the object shown in FIG. 1.

FIG. 11 indicates an example of a light-exposure (light-treatment) method suitable for a Fresnel lens 1a as shown in FIG. 1 or a Fresnel lens 1f as shown in FIG. 6. The Fresnel lens 1a or 1f is so supported as to rotate about the center $O_1$ in the direction indicated by the arrow B, and a light source 15 is disposed above the uneven surface of the Fresnel lens 1a or 1f. More specifically, the light source 15 is disposed above a portion adjacent to the outer periphery of a sector 16 with a relatively small center angle $\alpha$ of the center $O_1$ of the Fresnel lens 1a or 1f, and partition walls 17a are erected so that the space above the sector 16 is separated from the remaining space, whereby the light rays from the light source 15 can be prevented from striking the surface other than the sector 16. The Fresnel lens 1a or 1f is rotated in the direction B as described above, and the light beams emitted from the light source 15 are made to obliquely and radially outwardly strike the whole inclined surfaces 7 of the ridge portions within the sector 16. In this case, no light ray strikes the vertical surfaces 8 of the ridge portions R so that the back light shielding film can be applied as coating over only the vertical surfaces 8 because the latter are not exposed to the light rays.

Figure 12:
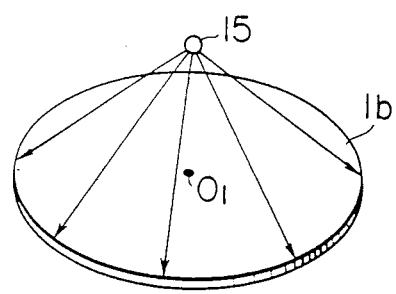
FIG. 12 is a perspective view showing a mode of light projection onto the object shown in FIG. 2.

FIG. 12 indicates an example of a light-exposure method suitable for a Fresnel lens 1b as shown in FIG. 2. The light source 15 is disposed immediately above the center $O_1$ of the Fresnel lens 1b, and the light rays emitted from the light source 15 strike the whole surface of the uneven surface of the Fresnel lens 1b except undesired portions. With this arrangement, the light rays are inclined toward the outer periphery of the Fresnel lens 1b so that the vertical surfaces 8 (See FIG. 2) of the Fresnel lens 1b are to exposed to the light rays. As a result, the black light shielding films can be formed over the vertical surfaces 8.

Figure 13:
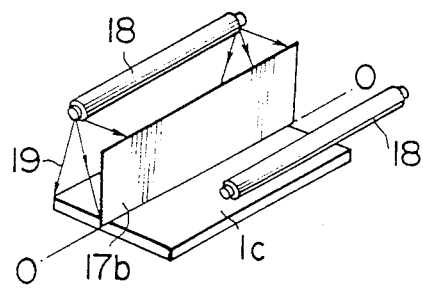
FIG. 13 is a perspective view showing a mode of light projection onto the object shown in FIG. 3.

FIG. 13 indicates an example of a light-exposure method suitable for a Fresnel plate 1c as shown in FIG. 3. The angles of inclination of the inclined surfaces 7 of the Fresnel plate 1c are different from each other on each side of the center line O—O. Therefore, the light source 15 of the type described above; that is, a point light source cannot be used. Instead a line light source 18 such as a fluorescent lamp in the form of a rod which emits a flattened light beam 19 is disposed adjacent to one side of the Fresnel plate 1c in parallel with the ridge portions or steps R. Then the photosensitive films on the inclined surfaces 7 of the Fresnel plate 1c can be removed so that the inclined surfaces 7 become transparent while the black light shielding films are formed over only the vertical surfaces 8.

Figure 14:
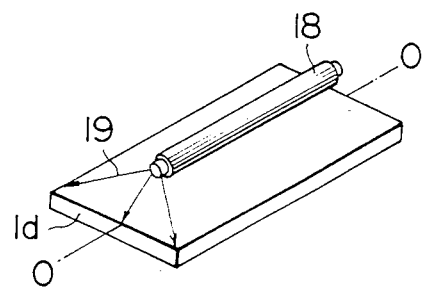
FIG. 14 is a perspective view showing a mode of light projection onto the object shown in FIG. 4.

FIG. 14 indicates an example of a light-exposure method suitable for a Fresnel lens 1d as shown in FIG. 4. The light source 18 is disposed immediately above the center line O—O of the Fresnel plate 1d in parallel with the ridge portions or steps R thereof. The direction of inclination of the inclined surfaces 7 of the Fresnel plate 1d is opposite to that of the Fresnel plate 1c so that the black light shielding films can be formed over the vertical surfaces 8.

Figure 15:
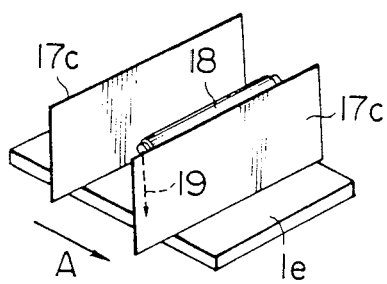
FIG. 15 is a perspective view showing a mode of light projection onto the object shown in FIG. 5.

FIG. 15 indicates an example of a light-exposure method suitable for a Fresnel plate 1e as shown in FIG. 5. This is a specific example in concrete form for forming the black light shielding film 10a shown in FIG. 10. Two light shielding plates 17c are disposed perpendicular to the surface of the Fresnel plate 1e and parallel to the ridge portions or steps R and are spaced apart from each other by a suitable distance so that only one portion of the Fresnel plate 1e is exposed to the light 19; that is, the portions other than said one portion of the Fresnel plate 14 are not exposed to the light 19. A line light source 18 is disposed centrally between and at the upper part of the two light shielding plates 17c and in parallel with the ridge portions or steps R. The flattened light rays 19 are projected onto the uneven surface of the Fresnel plate 1e between the light shielding plates 17c while the Fresnel plate 1e is gradually shifted in the direction indicated by the arrow A. Then the black light shielding film 10a can be formed only on the vertical surfaces 8.

In the above described examples, the Fresnel lenses and plates have been described as being rigid, but it is to be understood that the present invention may be equally applied to a soft sheet.

Figure 16:
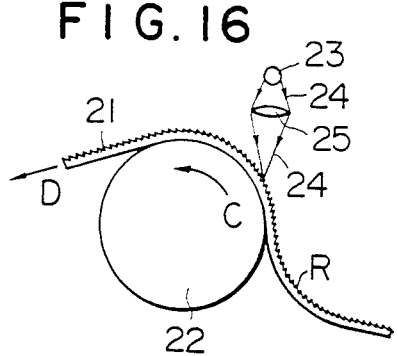
FIG. 16 is a side view showing a mode of irradiating a flexible web-form or belt-form object with light.

A method for exposing to light a web-shaped Fresnel sheet 21 will be described with reference to FIG. 16.

A cylindrical drum 22 is rotatably supported to rotate in the direction indicated by the arrow C, and the Fresnel sheet 21 is placed in engagement with this rotary drum 22 with the uneven surface having ridges R of the Fresnel sheet 21 facing oppositely to the surface of the rotary drum 22. By means of a motor (not shown), the rotary drum 22 is rotated in the direction C so that the Fresnel sheet 21 is moved in the direction indicated by the arrow D. It should be noted here that the steps R of the Fresnel sheet 21 are parallel to the axis of rotation of the rotary drum 22. With this arrangement, the portion of the Fresnel sheet 21 in contact with the cylindrical surface of the rotary drum 22 is expanded. Light rays emitted from a light source 23 are converged by a lens 25 and irradiate the rounded portion of the Fresnel sheet 21. Therefore only a specific local portion of the Fresnel sheet 21 is irradiated by the light rays 24 so that the black light shielding films can be formed in a manner substantially similar to that described above.

So far examples in which the light source is made stationary and the Fresnel plates and sheets are made the moving side have been described, it will be even more convenient if the Fresnel plates and sheets are made stationary and the light source is made moveable. In the latter case, it is desirable that a microcomputer be used so as to control the position at which the light source is turned on and the time interval during which the light source is kept turned on while the Fresnel plate or sheet is moved in a prescribed direction. In addition, when by means of the above mentioned computer, control is exercised to cause light rays to become parallel rays, converging rays, diffused rays, etc., the most desirable Fresnel plates and sheets which the present invention intends to obtain can be easily fabricated.

The method for applying a photosensitive material onto a Fresnel plate or the like so as to form a photosensitive film and the method for removing the photosensitive film which has been exposed or not exposed to the light are substantially similar in principle to those employed for developing a conventional photographic film so that no further description will be made in this specification. The uneven surfaces shown in the accompanying drawings are exaggerated for the sake of simplicity, but it is to be understood that in practice the surface unevenness is very fine.

As described above, only minute portions of the Fresnel plates and lenses are coated with the black light-shielding film which deluster these minute portions so that the inherent performance of the Fresnel plates or lenses can be remarkably improved. In addition, the extremely small portions of the Fresnel plates or lenses which are coated with the black light-shielding films can shield out light beams and therefore define the so-called "black walls", so that the light rays which have the components capable of being transmitted through the vertical surfaces 8 can be shielded out. As a result, glare can be prevented. Especially when a Fresnel plate is used in conjunction with an overhead projector and is coated with the light shielding film in the manner described above, glare from the light source can be prevented from being viewed by viewers.

Figure 17:
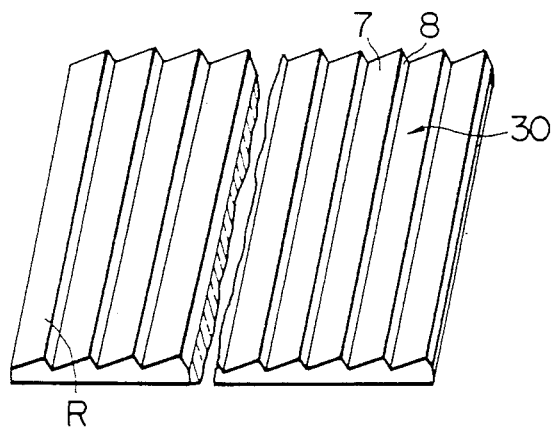
FIG. 17 is a perspective view of a visor for deflecting the light rays reflected from the surface thereof outside of the field of view of a viewer to which the method of the present invention can be applied.
Figure 18:
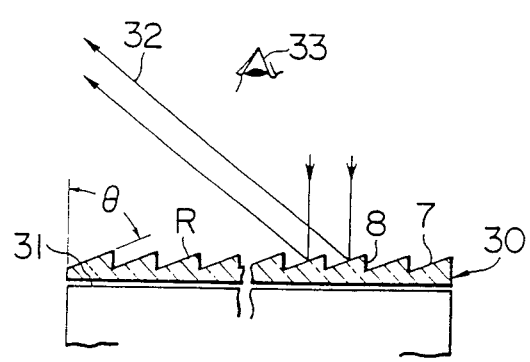
FIG. 18 is a cross sectional view thereof.

So far the present invention has been described in conjunction with the fabrication of Fresnel lenses, plates or sheets, it is to be understood that the present invention is equally applicable to a visor used in conjunction with the display screen of a cathode-ray tube or the like for directing the light rays reflected from the face of the display screen outside of the field of view. Such a visor comprises a transparent body (or sheet) 30 having a plurality of fine parallel ridges R each having an inclined surface 7 and a vertical surface 8 as shown in FIGS. 17 and 18. When the plate 30 is disposed in front of the display screen 31, the light rays 32 reflected at the visor plate 30 are directed outside of the field of view of the eyes 33 of a viewer watching the display screen 31 so that the viewer can view the display screen 31 through the visor plate 30 without encountering dazzling glare due to reflected light rays.

However when the visor of the type described above is attached to, for example, the display screen of a cathode-ray tube, amply satisfactory effectiveness cannot be attained because of its construction.

For instance, in the case of the display by a cathode-ray tube, at least two important conditions must be satisfied so that a viewer can distinctly see the display on the screen.

The first condition is that the light rays reflected at the surface of the screen must not strike the eyes of a viewer, and the second condition is that undesired light rays are not incident on the display screen, thereby adversely affecting the contrast of the pattern being displayed. Undesired light rays are those striking the vertical surfaces 8 of the ridge portions R, resulting in various adverse effects such as glare, double images, diffusion of light and so on. These adverse effects are more pronounced as the angle θ shown in FIG. 18 is decreased. On the other hand, the greater the angle θ becomes, the less the effect of redirecting the light rays reflected from the surface of the screen visor 30 outside of the field of view of a viewer becomes. As described above, the conventional screen visor has such a contradicting problem.

Figure 19:
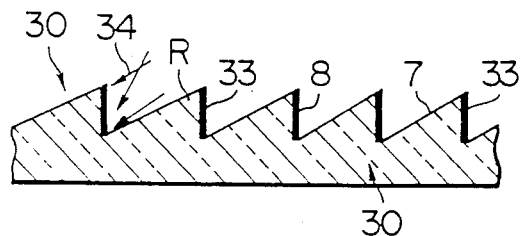
FIG. 19 is an enlarged fragmentary sectional view showing the visor in a state wherein it is coated with a light shielding film.

According to the present invention, however, such a problem as described above can be overcome by applying the light shielding film 33 over only the vertical surfaces 8 of the ridge portions R of the screen visor 30 as shown in FIG. 19. That is, this light shielding film 33 can shield out the light rays striking the vertical surfaces 8 in the direction indicated by the arrow 34 so that the display screen can be distinctly viewed. In addition, in order to completely suppress the light rays reflected from the surface of the display screen, the angle θ can be decreased so that the inclined surfaces 7 can be inclined more steeply. Thus, the above-described two conditions can be satisfied. The light shielding film 33 can be formed in a manner substantially similar to that described in conjunction with FIG. 15.

Figure 20:
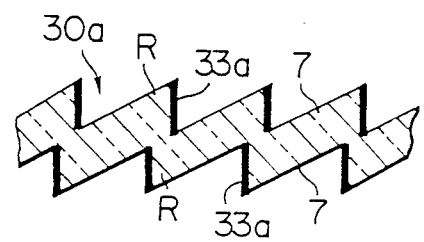
FIG. 20 is an enlarged fragmentary sectional view of a modification thereof.

The screen visor may be a plate 30a having ridge portions R on both major surfaces thereof as shown in FIG. 20. The light shielding film 33a can be formed in a manner similar to that described above.

Figure 21:
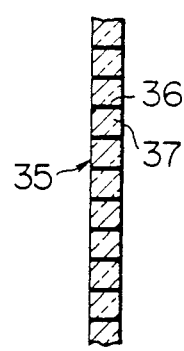
FIG. 21 is a cross sectional view showing a conventional blind plate.

In order to attain the light shielding effect for shielding out the light rays incident at undesired angles, there has been devised and demonstrated a blind plate 35 as shown in FIG. 21. The blind plate 35 is in the form of an assembly of plurality of transparent plastic blocks 37 having a plurality of parallel black films 36 spaced apart from each other by a suitable distance. Such a blind plate 35 has a most satisfactory light shielding effect, but it must be slice-polished after the plastic blocks 37 are assembled in the form of a block so that it is not adaptable for mass production. As a result, it is extremely expensive and is therefore not suited for general uses. Furthermore, it has a fatal defect when applied to the display screen of a cathoderay tube because the above-described first condition that the reflection from the surface must be suppressed is not satisfied.

The step for forming a photosensitive film, the step for exposing the photosensitive film thus formed to light rays, and the step for washing off the undesired photosensitive film used in the method for forming partial films over the uneven surfaces of a body in accordance with the present invention are all adaptable to mass production so that the fabrication cost can be considerably decreased. In addition, the Fresnel plates and sheets to which the present invention is applied can increase the angle of a prism so that the effect for redirecting the light rays reflected from the surface of a body outside of the field of view of a viewer is very satisfactory. In addition, a satisfactory light shielding effect can be attained. As a result, the present invention can be applied to various fields.

INDUSTRIAL APPLICABLITY

In addition to lenses, prisms, Fresnel plates, Fresnel lenses, visors for redirecting the light rays reflected from the surface of an object outside the field of view of a viewer, and other optical-path varying elements, the method of the present invention can be applied equally to any objects having uneven surfaces in order to form partial films thereon.

I claim:

1. A method for forming partial films over an uneven surface of an object having spaced apart ridge portions, comprising the steps of: applying a photosensitive agent onto the entire uneven surface of the object; projecting light rays emitted from a light source obliquely against said uneven surface of said object in such a manner that only the surface portions of the ridge portions which face said light source are exposed while the remaining surface portions which do not face said light source are left unexposed to said light rays; etching the photosensitive film thus treated; and washing the uneven surface, whereby a film is left over only said surface portions exposed to said light rays or over said remaining surface portions which have not been exposed to said light rays.

2. A method as set forth in claim 1 wherein the light rays are projected against said uneven surface of said object at least from two directions.

3. A method as set forth in claim 1 wherein the cross section of said uneven surface is in the form of a curved waveform.

4. A method as set forth in claim 1 wherein the cross section of said uneven surface is in the form of a sawtooth waveform.

5. A method as set forth in claim 1 wherein: said object is as a whole in the form of a disk; the ridge portions comprise concentric annular steps; said light source is disposed immediately above an uneven surface portion adjacent to the periphery of said object within a sector having a relatively small center angle with respect to the center of said object; partition means are disposed for separating the space immediately above said sector from the remaining space in such a way that the light rays from said light source will not reach the uneven surfaces other than the uneven surface confined by said sector; and said object is rotated about its center.

6. A method as set forth in claim 1 wherein: said object is in the form of a disk as a whole; said ridge portions are concentric annular steps; said light source is disposed immediately above the center of said object; and said object is rotated about its center.

7. A emthod as set forth in claim 1 wherein: said object is in the form of a plate; said ridge portions of said uneven surface are symmetrical about the center line of the plate-shaped object, are parallel to said center line, and are in the form of straight steps; a light shielding plate is erected above said uneven surface along the center line of said plate-shaped object; a line light source is disposed immediately above a portion adjacent to the outer edge at each side of said light shielding plate so as to be parallel with the ridge portions; and the light rays are projected onto each side of said light shielding plate.

8. A method as set forth in claim 1 wherein: said object is in the form of a plate; the ridge portions of said uneven surface are symmetrical about the center line of said plate-shaped object and are in parallel therewith; and a line light source is disposed along said center line above said uneven surface in parallel with said ridge portions so as to project light rays.

9. A method as set forth in claim 1 wherein: said object is in the form of a plate; said ridge portions of said uneven surface are in parallel with each other; two light shielding plates are erected on said plate-shaped object in parallel with said ridge portions and are spaced apart from each other by a suitable distance; a line light source is disposed between said two light shielding plates in parallel with said ridge portions to project light rays; and said plate-shaped object is displaced with respect to said two light shielding plates in a direction at right angles to said ridge portions.

10. A method as set forth in claim 1 wherein: said object is in the form of a flexible web; said ridge portions of said uneven surface are extended in the direction perpendicular to the longitudinal direction of said flexible web object and are in parallel with each other; said flexible web object is placed into contact with the surface of a guide means and transported in the longitudinal direction in such a way that said guide means partially deforms said flexible web object to form a bulging portion while said ridge portions can be maintained straight and in parallel with each other; and the light rays from a light source disposed in parallel with said ridge portions are projected onto the uneven surface which is thus partially deformed into said arcuate portion.

11. A method as set forth in claim 10 wherein said guide means comprises a drum.

12. A method as set forth in claim 1 wherein said light rays are in parallel with each other.

13. A method as set forth in claim 1 wherein said light rays are converged.

14. A method as set forth in claim 1 wherein said light rays are projected as diffused light.

15. A method as set forth in claim 1 wherein said object is an optical-path-varying element such as a lens, a prism or a Fresnel plate.

* * * * *